(12) United States Patent
Sixt et al.

(10) Patent No.: US 8,598,294 B2
(45) Date of Patent: Dec. 3, 2013

(54) SELF-ADHESIVE HARDENER COMPOSITION

(75) Inventors: Torsten Sixt, Mehring (DE); Franz Neuhauser, Geretsberg (AT)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/274,399

(22) Filed: Oct. 17, 2011

(65) Prior Publication Data

US 2012/0101237 A1    Apr. 26, 2012

(30) Foreign Application Priority Data

Oct. 20, 2010  (DE) .......................... 10 2010 042 712

(51) Int. Cl.
*C08G 77/04* (2006.01)
*C08G 77/08* (2006.01)

(52) U.S. Cl.
USPC ............................................................ 528/14

(58) Field of Classification Search
None
See application file for complete search history.

(56) References Cited

U.S. PATENT DOCUMENTS

| | | | | |
|---|---|---|---|---|
| 4,257,932 A | * | 3/1981 | Beers | 524/588 |
| 4,508,888 A | * | 4/1985 | Letoffe et al. | 528/23 |
| 4,689,363 A | * | 8/1987 | Inoue et al. | 524/394 |
| 4,965,333 A | * | 10/1990 | Inouye et al. | 528/33 |
| 5,085,894 A | * | 2/1992 | Pascucci et al. | 427/387 |
| 5,300,611 A | * | 4/1994 | Fujioka et al. | 528/14 |
| 5,346,940 A | * | 9/1994 | Brassard et al. | 524/267 |
| 5,449,553 A | * | 9/1995 | Griffith | 428/332 |
| 5,936,032 A | * | 8/1999 | Angus, Jr. | 524/863 |
| 5,985,991 A | * | 11/1999 | Beljanski et al. | 524/779 |
| 6,165,620 A | * | 12/2000 | Harblin et al. | 428/450 |
| 6,593,413 B2 | * | 7/2003 | Muramatsu et al. | 524/493 |
| 7,026,426 B2 | * | 4/2006 | Kimura | 528/38 |
| 7,534,840 B2 | * | 5/2009 | Futatsumori et al. | 525/477 |
| 7,754,829 B2 | * | 7/2010 | Kimura | 525/477 |
| 8,110,067 B2 | * | 2/2012 | Levandoski et al. | 156/329 |
| 2003/0149152 A1 | * | 8/2003 | Hao | 524/435 |
| 2004/0242762 A1 | * | 12/2004 | Horikoshi et al. | 524/588 |
| 2006/0258817 A1 | * | 11/2006 | Kimura | 525/477 |
| 2007/0088123 A1 | * | 4/2007 | Futatsumori et al. | 524/863 |
| 2008/0026322 A1 | | 1/2008 | Ogihara et al. | |
| 2008/0096030 A1 | * | 4/2008 | Horikoshi et al. | 428/447 |
| 2008/0284106 A1 | * | 11/2008 | Maton et al. | 277/316 |
| 2008/0293865 A1 | * | 11/2008 | Kameda et al. | 524/425 |
| 2012/0111498 A1 | * | 5/2012 | Verosky et al. | 156/329 |

FOREIGN PATENT DOCUMENTS

| | | |
|---|---|---|
| DE | 10 2006 060 357 A1 | 7/2007 |
| EP | 0 933 398 A2 | 8/1999 |
| WO | 01/49774 A2 | 7/2001 |
| WO | 2009080266 A1 | 7/2009 |

OTHER PUBLICATIONS

Walter Noll, "Chemistry and Technology of Silicones," 1968, 2nd Edition, p. 395.

* cited by examiner

*Primary Examiner* — Robert S Loewe
(74) *Attorney, Agent, or Firm* — Brooks Kushman P.C.

(57) ABSTRACT

Hardener composition for condensation-crosslinking RTV-2 silicone compositions contain
(A) at least one crosslinker,
(B) at least one crosslinking catalyst which is an alkali metal or alkaline earth metal compound which is not a hydroxide, and
(D) at least one functional silane as a coupling agent.

4 Claims, No Drawings

SELF-ADHESIVE HARDENER COMPOSITION

CROSS-REFERENCE TO RELATED APPLICATION

This application claims priority to German Patent Application No. DE 10 2010 042 712.8 filed Oct. 20, 2010 which is herein incorporated by reference.

BACKGROUND OF THE INVENTION

1. Field of the Invention

Two-component (2K) silicone compositions have been known for a relatively long time in the prior art and are often used as adhesives and sealants in various applications.

2. Description of the Related Art

Two-component silicones which crosslink at room temperature are referred to as "room temperature vulcanizing 2 part silicones" (RTV-2). One of the two components is frequently referred to as the polymer composition or as the "A component." The second component is frequently referred to as the hardener composition or else as the "B component." Such formulations typically contain tin compounds as crosslinking catalysts which catalyze the crosslinking (polycondensation) of the polymers by means of the crosslinker components at room temperature, as described, for example, in Walter Noll, Chemistry and Technology of Silicones, 1968, 2nd edition, page 395ff.

Although the polycondensation reaction can also proceed without a catalyst, catalysts are required to allow the crosslinking to occur within acceptable time frames. Such catalysts are usually based on heavy metals, usually organotin compounds, as previously indicated. Discussion has heightened recently regarding the risk potential of such organotin compounds and also the known ability of tin compounds to promote the backreaction (reversion) making it necessary to seek alternative catalysts. However, previous attempts at a solution have shown that the reactivity of alternative catalysts is not sufficiently good or else the composition is not storage-stable. Thus, for example, bismuth carboxylates in combination with aminofunctional alkoxysilanes tend to form of a colloidal Bi(0) precipitate, resulting in a decrease in the amount of active Bi(III) available, and destroying storage stability.

Titanium-catalyzed, one-component condensation compositions are known in the prior art, as described, for example, in WO 01/49774 A2, but cannot be applied to two-component systems since titanium compounds lead to spontaneous vulcanization of α,ω-dihydroxy-functional polymers used in such compositions. In addition, titanium compounds are greatly inhibited by amine-containing compounds, which rules out the formulation of self-adhesive compositions.

Other metal compounds such as zinc acetylacetonate or aluminum acetylacetonate when used as catalysts lead to functionalization of the reactive end groups, i.e. a reaction competing with crosslinking, which brings about a conversion to the RTV-1 mechanism.

As tin-free alternatives, calcined kaolin is used as catalyst in WO 2009/080266, and in EP 0 933 398 A together with basic components. Since kaolin is present in dispersed form and is used in WO 2009/080266 in amounts of from 3 to 400 parts per 100 parts of polymer, it has the disadvantage that no transparent compositions cannot be produced.

SUMMARY OF THE INVENTION

It is therefore an object of the present invention to provide hardener compositions for 2K-silicone compositions which are free of catalysts which are problematical under hazardous materials laws and are additionally self-adhesive. The coupling agents used for this purpose must not inhibit the catalyst. Furthermore, typical pot lives for industrial processing should be achieved and no decrease in reactivity should occur after storage. These and other objects are achieved by the hardener composition of the invention for condensation-crosslinking RTV-2 silicone compositions, which comprises (A) at least one crosslinker,
(B) at least one crosslinking catalyst selected from the group consisting of compounds of the alkali metals and alkaline earth metals, with the exception of the hydroxides thereof,
(D) at least one functional silane as a coupling agent.

DETAILED DESCRIPTION OF THE PREFERRED EMBODIMENTS

The hardener composition of the invention is used together with a polymer composition as a second component in RTV-2 systems. Such polymer compositions for RTV-2 systems have long been known to those skilled in the art. They usually contain hydroxy-terminated polydimethylsiloxanes as crosslinkable polymers, usually trimethylsilyl-terminated polydimethylsiloxanes as a plasticizer component, and reinforcing or nonreinforcing fillers such as silica, carbon black, quartz, chalk, diatomaceous earth, etc. Optional components such as heat stabilizers, additives for optimizing rheology or specific properties, fungicides, etc. are also used.

The crosslinkers (A) used according to the invention are preferably organosilicon compounds of the general formula (I)

$$Z_c SiR^2{}_{(4-c)} \qquad (I)$$

where
the radicals $R^2$ can be identical or different and are, independently of one another, monovalent, optionally halogen-substituted hydrocarbon radicals which can be interrupted by oxygen atoms,
the radicals Z can be identical or different and are, independently of one another, hydrolyzable radicals and
c is 3 or 4,
and partial hydrolyzates thereof.

The partial hydrolyzates can be partial homohydrolyzates, i.e. partial hydrolyzates of one type of organosilicon compound of the general formula (I), and also partial cohydrolyzates, i.e, partial hydrolyzates of at least two different types of organosilicon compounds of the general formula (I). These crosslinkers or partial hydrolyzates according to the invention have a maximum weight average Mw of 1200 g/mol.

Although not indicated in formula (I), the organosilicon compounds used according to the invention can, as a result of the method of production, have a small proportion of hydroxyl groups, preferably up to a maximum of 5% of all Si-bonded radicals. If the crosslinkers (A) used in the compositions of the invention are partial hydrolyzates of organosilicon compounds of the formula (I), those having up to 10 silicon atoms are preferred.

The radicals $R^2$ are preferably monovalent hydrocarbon radicals which have from 1 to 18 carbon atoms and may optionally be substituted by halogen atoms, ether groups or (poly)glycol radicals, where the latter are made up of oxyethylene and/or oxypropylene units. However, radicals $R^2$ can also be divalent radicals which, for example, join two silyl groups to one another.

Examples of radicals $R^2$ are alkyl radicals such as the methyl, ethyl, n-propyl, isopropyl, 1-n-butyl, 2-n-butyl, isobutyl, tert-butyl, n-pentyl, isopentyl, neopentyl, and tertpentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m-, and p-tolyl radicals, xylyl radicals and ethylphenyl radicals; and aralkyl radicals such as the benzyl radical, and the α- and β-phenylethyl radicals.

Examples of radicals $R^2$ interrupted by oxygen are methoxyethyl, ethoxyethyl and ethoxyethoxyethyl radicals. Examples of divalent radicals $R^2$ are polyisobutylenediyl radicals and propanediyl-terminated polypropylene glycol radicals. As radicals $R^2$, preference is given to hydrocarbon radicals having from 1 to 12 carbon atoms, most preferably the methyl and vinyl radicals.

Examples of Z are all previously known hydrolyzable radicals such as optionally substituted hydrocarbon radicals bound via an oxygen atom or nitrogen atom to the silicon atom. The radical Z is preferably an —$OR^1$ radical, where $R^1$ is a substituted or unsubstituted hydrocarbon radical which may be interrupted by oxygen atoms. Examples of Z are methoxy, ethoxy, n-propoxy, isopropoxy, n-butoxy, isobutoxy, sec-butoxy, tert-butoxy and 2-methoxyethoxy radicals; amino radicals such as the methylamino, dimethylamino, ethylamino, diethylamino and cyclohexylamino radicals; amido radicals such as the n-methylacetamido and benzamido radicals; aminoxy radicals such as the diethylaminoxy radical; oximo radicals, such as the dimethylketoximo, methylethylketoximo and methylisobutylketoximo radicals; enoxy radicals such as the 2-propenoxy radical; and acyloxy radicals such as acetyl groups.

The crosslinkers (A) used in the compositions of the invention are preferably tetramethoxysilane, tetraethoxysilane, tetrapropoxysilane, tetrabutoxysilane, methyltrimethoxysilane, methyltriethoxysilane, vinyltrimethoxysilane, vinyltriethoxy-silane, phenyltrimethoxysilane, phenyltriethoxysilane, 1,2-bis(trimethoxysilyl)ethane, 1,2-bis(triethoxysilyl)ethane and also partial hydrolyzates of the organosilicon compounds mentioned, e.g. hexaethoxydisiloxane.

The crosslinkers (A) are most preferably tetraethoxysilane, tetrapropoxy-silane, methyltrimethoxysilane, methyltriethoxysilane, vinyltrimethoxysilane, vinyltri-ethoxysilane, phenyltrimethoxysilane, 1,2-bis(trimethoxysilyl)ethane, 1,2-bis(tri-ethoxysilyl)ethane and also partial hydrolyzates thereof, in particular tetraethoxysilane, 1,2-bis(triethoxysilyl)ethane, vinyltrimethoxysilane, vinyltriethoxysilane and partial hydrolyzates and cohydrolyzates thereof.

The crosslinkers (A) used in the hardener compositions of the invention are commercial products or can be prepared by methods known in silicon chemistry, and are used in such amounts that an at least two-fold molar excess of hydrolyzable or hydrolyzed crosslinker functions based on the end group content of the constituents to be crosslinked is obtained. Preference is given to setting a molar ratio of crosslinker functions to the groups to be crosslinked of from 2:1 to 10:1.

Catalysts (B) used according to the invention are compounds of the alkali metals and alkaline earth metals, with the exception of the hydroxides thereof. The compounds of lithium are preferred as catalyst (B). Particular preference is given to the corresponding carboxylates. The hardener compositions of the invention contain catalyst (B) in the amounts usual for the condensation reaction. In ready-to-use RTV-2 mixtures (hardener composition+polymer composition), these are, in the case of Li compounds, in the range 50-1000 ppm, in each case based on the metal. Particular preference is given to the range 100-500 ppm.

The hardener compositions of the invention contain coupling agents (D) as a further component. They are viewed as functional silanes and are different from component (A). Examples of the coupling agents (D) used in the compositions of the invention are silanes and organopolysiloxanes having functional groups, for example those having glycidoxy, amino or methacryloxy radicals. Furthermore, silanes having hydrolyzable groups and SiC-bonded vinyl, acryloxy, methacryloxy, epoxy, acid anhydride, acid, ester, cyanurate-, carbamato- or ureido-functional groups and also partial hydrolyzates and cohydrolyzates thereof can be used as coupling agents (D). Preferred coupling agents are amino-, acryl-, epoxy-, cyanurato-, carbamato- or ureido-functional silanes having hydrolyzable groups or partial hydrolyzates thereof. (D) is preferably present in such amounts that a proportion of preferably up to 50 parts by weight, more preferably from 0.1 to 20 parts by weight, and in particular from 0.25 to 10 parts by weight of (D) is present per 100 parts by weight of the catalyzed, ready-to-use RTV-2 mixture (hardener composition plus polymer composition).

In addition, component (C) can be added as further constituent to the hardener composition in order to be able to adjust the mixing ratio of the hardener composition with the polymer composition in an RTV-2 system more readily and to make all constituents miscible. Component (C) thus serves to increase the volume of the hardener composition, which makes better control of metering during mixing possible and ensures homogeneity of the mixture. Extender polymers (C) used are linear or branched organosilicon compounds or else organic polymers or nonvolatile hydrocarbons.

In addition, the hardener composition can contain further constituents (E) which have long been known to those skilled in the art. Examples of (E) which can be used in the compositions of the invention are fillers such as reinforcing and nonreinforcing fillers, plasticizers, soluble dyes, inorganic and organic pigments, solvents, fungicides, fragrances, dispersants, rheological additives, corrosion inhibitors, oxidation inhibitors, light stabilizers, heat stabilizers, flame retardants and agents for influencing the electrical properties. The compositions preferably contain no additional ingredients other than ingredients (A) through (E).

The hardener composition of the invention is used as a component in condensation-crosslinking RTV-2 silicone compositions. These condensation-crosslinking RTV-2 silicone compositions are in turn employed, for example, as adhesives and sealants in various applications. Such compositions can also be used for potting, coating or insulation of electric or electronic components.

EXAMPLES

In the examples described below, all parts and percentages are, unless indicated otherwise, by weight. Unless indicated otherwise, the following examples are carried out at the pressure of the surrounding atmosphere, i.e. at about 1000 hPa, and at room temperature, i.e. at about 20° C., or at a temperature which is established on combining the reactants at room temperature without additional heating or cooling. In the following, all viscosities relate to the dynamic viscosity at a temperature of 20° C. and a shear rate 1 s$^{-1}$. The following examples illustrate the invention without having a limiting effect.

The following abbreviations are used:
Shore A hardness in accordance with DIN 53505
EB elongation at break in accordance with DIN 53504-85S1, in %
UTS ultimate tensile strength in accordance with DIN 53504-85S1, in N/mm$^2$ Example 1

Polymer Composition

ELASTOSIL® RT 774, commercially available from Wacker Chemie AG, Munich, was used as a polymer composition.
Examples of Hardener Compositions Comparative Example C2

Not According to the Invention

The hardener T77, commercially available from Wacker Chemie AG, Munich, was used as hardener composition for the comparative example.

Example 3

According to the Invention 15 parts of trimethylsilyl-terminated polydimethylsiloxane having a viscosity of 1000 mPa·s and 30 parts of a vinyl-terminated polydimethylsiloxane are mixed with 20 parts of a partially hydrolyzed tetraethyl silicate TES40 (Wacker Chemie AG), 5 parts of γ-aminopropyltriethoxysilane, 5 parts of N-aminoethylamino-propyltrimethoxysilane and 15 parts of Oktasoligen Li 2 (from Borchers, Monheim) to give a homogeneous mixture.

Example 4

According to the Invention 30 parts of a hydroxyl-free resin component containing 30% of T units and 70% of D units and having a weight average of 2800 g/mol are mixed with 18 parts of a partially hydrolyzed tetraethyl silicate TES40, 20 parts of γ-aminopropyltriethoxysilane, 7 parts of Ensacko MS carbon black (from Timcal, Düsseldorf) and 25 parts of Oktasoligen Li 2 (from Borchers, Monheim) to give a homogeneous mixture.

Example 5

According to the Invention 30 parts of a hydroxyl-free resin component containing 30% of T units and 70% of D units and having a weight average of 2800 g/mol are mixed with 30 parts of a partially hydrolyzed tetraethyl silicate TES40, 15 parts of γ-aminopropyltriethoxysilane and 25 parts of Oktasoligen Li 2 (from Borchers, Monheim) to give a homogeneous mixture.

Example 6

According to the Invention 25 parts of a hydroxyl-free resin component containing 30% of T units and 70% of D units and having a weight average of 2800 g/mol are homogenized with 20 parts of a partially hydrolyzed tetraethyl silicate TES40, 20 parts of γ-aminopropyltriethoxysilane, 10 parts of carbon black (Ensacko MS) to give a stiff paste and admixed with 25 parts of Oktasoligen Li 2 (from Borchers, Monheim).

The respective mixing ratio of the polymer composition of example 1 to the hardener compositions from examples 2 to 6 was 9:1. The pot life is defined as the time until 1000 Pa·s is exceeded, determined by means of a cone-and-plate rheometer at D=1.0 s$^{-1}$.

TABLE 1

| Examples | C2 | 3 | 4 | 5 | 6 |
|---|---|---|---|---|---|
| Pot life [min] | 10 | 20 | 60 | 40 | 60 |
| Shore A | 46 | 26 | 28 | 30 | 25 |
| UTS | 1.8 | 1.6 | 1.2 | 1.4 | 1.2 |
| EB | 200 | 250 | 310 | 250 | 350 |

Table 1 shows the pot life after mixing of the two RTV-2 components, and the elastomer properties after vulcanization for 3 days. Very good pot lives and good deep vulcanization were able to be achieved using the hardener compositions of the invention, while the other elastomeric properties likewise fully met the requirements for such systems.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A condensation-crosslinking RTV-2 silicone composition comprising separate first and second components, wherein a second component is a hardener composition comprising:
   (A) at least one crosslinker,
   (B) at least one crosslinking catalyst selected from the group consisting of lithium carboxylates,
   (D) at least one functional silane as a coupling agent.

2. A method for the production of a hardener composition of claim 1, comprising mixing components (A), (B) and (D).

3. The condensation-crosslinking RTV-2 silicone composition of claim 1, wherein the crosslinking catalyst (B) is present in an amount of from 50-1000 ppm based on the total weight of polymer components in the first component of the RTV-2 silicone composition and the hardener component.

4. An adhesive or sealant, comprising a condensation-crosslinking RTV-2 silicon composition of claim 1.

* * * * *